(12) United States Patent
Safonov

(10) Patent No.: US 7,835,100 B2
(45) Date of Patent: Nov. 16, 2010

(54) LOGIC OPERATIONS ON A HARD DISK DRIVE

(76) Inventor: Vladimir L. Safonov, 1682 Crescent Knolls Glen, Escondido, CA (US) 92029

( * ) Notice: Subject to any disclaimer, the term of this patent is extended or adjusted under 35 U.S.C. 154(b) by 393 days.

(21) Appl. No.: 11/933,446

(22) Filed: Nov. 1, 2007

(65) Prior Publication Data
US 2009/0116133 A1 May 7, 2009

(51) Int. Cl.
*G11B 5/02* (2006.01)
(52) U.S. Cl. ....................................... 360/55
(58) Field of Classification Search ............... 360/40, 360/48, 39, 61, 49, 55; 375/259, 146; 365/230.05; 386/26; 341/119
See application file for complete search history.

(56) References Cited

U.S. PATENT DOCUMENTS

| | | | | |
|---|---|---|---|---|
| 4,503,546 A * | 3/1985 | Yoshine et al. | ............... | 375/259 |
| 4,710,824 A * | 12/1987 | Alston | .......................... | 386/26 |
| 6,754,130 B1 * | 6/2004 | Carter | .................... | 365/230.05 |
| 7,093,145 B2 * | 8/2006 | Werner et al. | ................ | 713/300 |
| 7,161,513 B2 * | 1/2007 | Werner et al. | ................ | 341/119 |
| 7,456,778 B2 * | 11/2008 | Werner et al. | ............... | 341/899 |
| 2008/0198904 A1 * | 8/2008 | Chang | ......................... | 375/146 |
| 2008/0288135 A1 * | 11/2008 | Katrak et al. | .................. | 701/33 |

* cited by examiner

*Primary Examiner*—Fred Tzeng

(57) ABSTRACT

A method of how to perform logic operations on a hard disk drive with magnetic media capable of superimposing the binary information is invented. Such media contain magnetic particles with different anisotropy fields and different anisotropy axes orientations. Three magnetization states are utilized. The binary information is encoded as 0–> 00 and 1–> 11. In the beginning, strong magnetic fields created by the writing head record the first binary number on a track as the sequence of transitions between different magnetization states. All previous information is erased. Then, moderate magnetic fields are applied to the same track and reverse a part of magnetic particles writing the second binary number. As the result, we obtain superimposed transitions between different magnetization states. The reading sensor detects the magnetization transitions and gives the result of logic operations.

7 Claims, 6 Drawing Sheets

LOGIC OPERATIONS ON A HARD DISK DRIVE

FIELD OF THE INVENTION

The present invention relates to logic operations on magnetic recording devices, and more particularly to the method of how to perform logic operations on a hard disk drive with a magnetic medium capable of superimposing the binary information.

BACKGROUND OF THE INVENTION

The hard disk drive is usually used as a binary information storage device, which consists of rapidly rotating disk with a magnetic surface and write-and-read head(s). The writing head creates strong magnetic fields and orients the magnetic particles on the surface of the disk. Switching the direction of the magnetic field yields a transition between the uniformly magnetized regions on the magnetic surface. This transition is detected as a binary 1 by a reading sensor. The absence of a transition at the measurement time is set to 0.

Our invention gives a practical new feature for the hard disk drive. It can work as an elementary processor (a logic device used to process binary information). Logic operations on the hard disk drive can be used as both a supplemental tool for a conventional semiconductor processor and for independent data processing. The Speed of this logic processor can be very high (~$10^8$ bit/sec and more): it is defined by the number of revolutions per second (~$10^2$ sec$^{-1}$) multiplied by the bit length of the track (~$10^6$ bit). The advantages include long binary word processing (important for a search of information) and small energy consumption which is mostly defined by a rotating motor.

The method of how to perform logic operations on a hard disk drive includes two important components. The first component is that the magnetic recording medium should be capable of superimposing the binary information. This make it possible to write two binary numbers sequentially on the same track while using different recording fields (strong and moderate ones), so that the resulting magnetization profile contains information about both written numbers. Three magnetization states (−M, 0, and +M) of the medium are utilized. Such a medium contains magnetic particles with 1) different anisotropy fields and/or with 2) different anisotropy axes orientations. For example, the first is an oriented (perpendicular or patterned) medium with a distribution of anisotropy fields. The second is typical for a longitudinal medium. One can also mention a so-called AFC medium, where a kind of magnetic superimposition was used to test the medium [E. E Fullerton et al., IEEE Trans. Magn. vol. 39, No. 2, p. 639 (2003)].

The second condition is, in order to perform logic operations, the binary information is encoded as 0−>00 and 1−>11. Technically this representation can be made with the doubling of the clock frequency for the hard disk drive.

The logic operation during disk revolutions includes three steps. In the beginning, strong magnetic fields created by the writing head record on a track the first binary number (A) as the sequence of transitions between different magnetization states (−M and +M). All previous information is erased. Then, moderate magnetic fields (from the same or other writing head), that can reverse just a part of magnetic particles, are applied to the same track and record on these particles the second binary number (B). Thus we obtain the superimposed transitions between 0 and M, −M and 0, and −M and M states. Finally, the reading sensor detects the magnetization transitions and gives the result of the logic operation for A and B.

SUMMARY OF THE INVENTION

The main objective of the present invention is to provide a method how to perform logic operations on a hard disk drive.

Another objective of the present invention is to integrate the storage and information processing into a single device, which can be used as both a supplemental tool for a conventional computer and for independent data processing.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
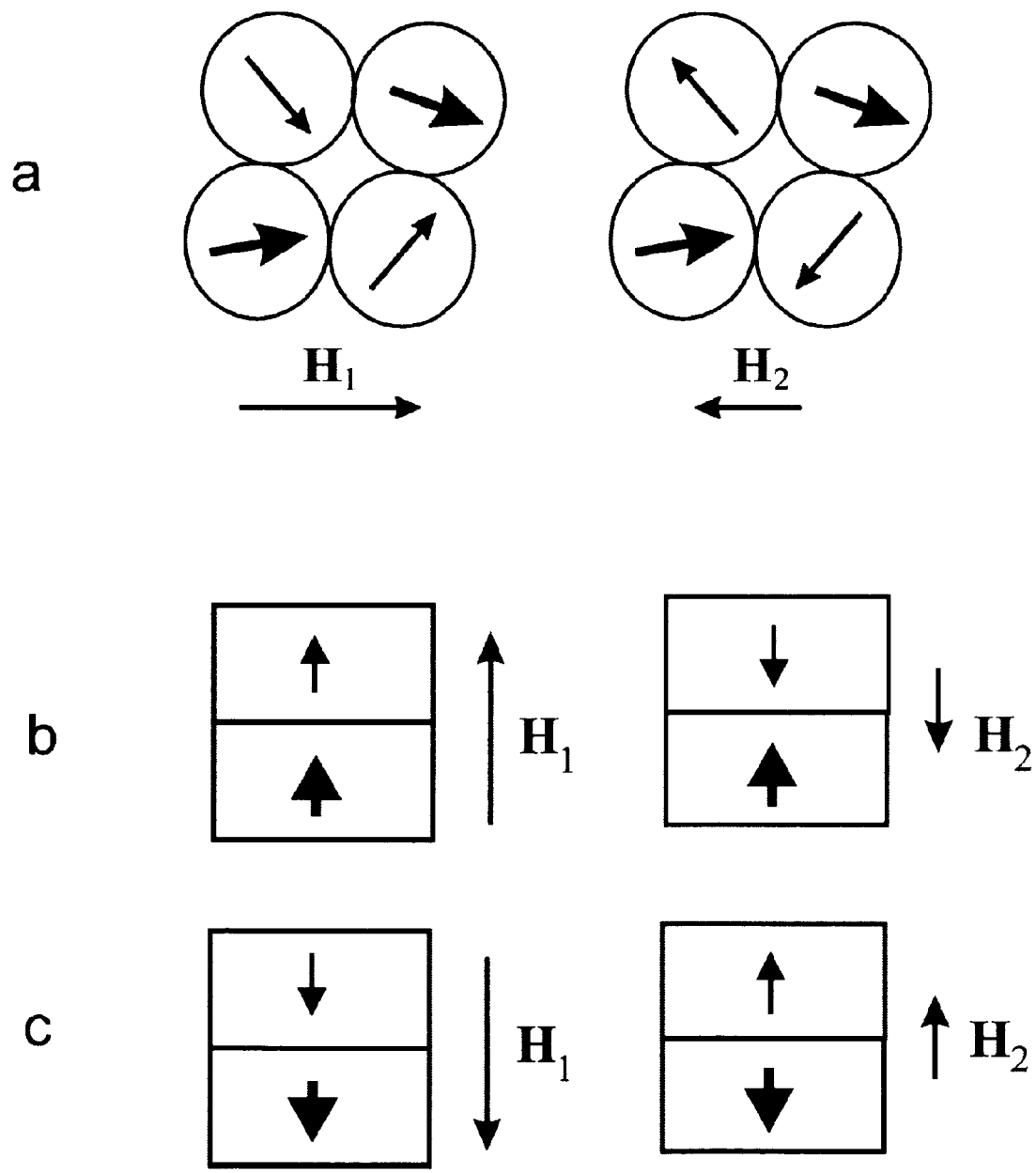
FIG. 1 is an illustration of superimposing of binary information. a) a longitudinal magnetic medium, b,c) a perpendicular medium. Strong magnetic field $H_1$ orients all particles in one direction. Moderate magnetic field $H_2$ reverses the particles with effectively smaller anisotropy field and does not reverse the magnetization of particles with stronger anisotropy field.

Without loss of generality we shall describe an example of how the method works for a perpendicular magnetic medium comprising of two types of particles with the uni-axial anisotropy fields $H_{K1}$ and $H_{K2}$, respectively ($H_{K1}>H_{K2}$) (see, FIG. 1b, c). The absolute values of magnetization of both types of particles are equal to M/2.

We consider the situation when the disk with magnetic surface rotates and the current creates magnetic fields in the write head to record the binary information. If the external magnetic field $H_1$ of the writing head is greater than the highest anisotropy field $H_{K1}$, all particles become oriented along this field (FIG. 1b, c, left). The absolute magnetization of the medium is equal to M. Applying the field $H_1$ up and down, we erase all the previous binary information and obtain a written pattern (number A) with −M and +M states and transitions between these states (see, FIG. 3a).

Then, after a revolution, we apply a moderate magnetic field $H_2$, (which is less than $H_{K1}$ but greater than $H_{K2}$) to the same recording track. The type 1 particles do not change their states for any orientation of $H_2$, but the type 2 particles reverse to the opposite direction if the direction of $H_2$ is opposite to the previously stored direction of these particles (FIG. 1b, c, right). So, the binary information (number B) is written on type 2 particles in this case (see, FIG. 3b).

It should be noted that the binary information should be represented in the form of "pulses" of magnetization M (FIG. 3a) and M/2 (FIG. 3b) relative to the −M and −M/2 states. The height of these pulses is 2M and M, respectively. Each pulse corresponds to the following encoding: 1−>11=I. The absence of pulse is 0−>00=O.

Quite the same description regarding the superimposed binary information (and logic operations below) is applicable for a longitudinal recording media. An illustration of how the superimposing of written bits occurs on the longitudinal medium is shown in FIG. 1a. The arrows in FIGS. 3-6 should be oriented horizontally. The field $H_1$ must be greater than the uni-axial anisotropy field $H_K$ of recording particles. The field $H_2$ corresponds to the reversal of particles, which axes are sufficiently deviated from the track direction. For a medium with identical particles and random axes distribution one has: $H_2=H_K\sqrt{3}/2 \approx 0.87 H_K$.

Figure 2:
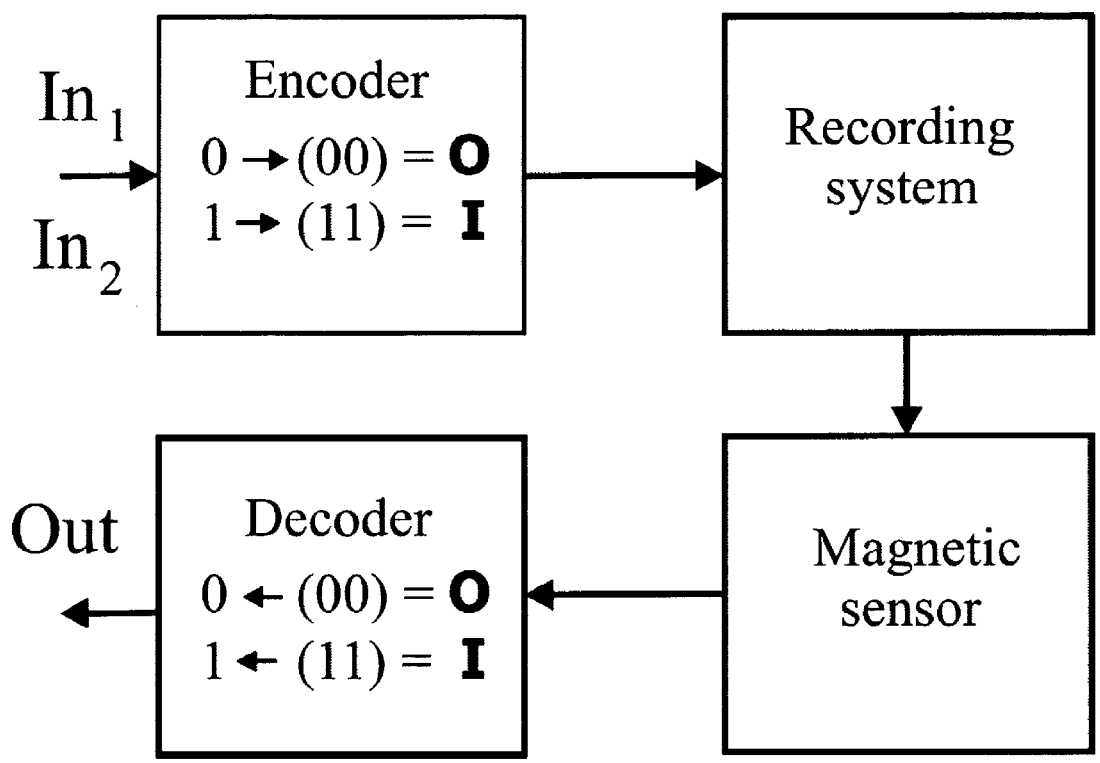
FIG. 2 is a schematic diagram of the logic operations.

FIG. 2 illustrates a block-scheme of the logic device. The input sequentially gives binary numbers and the instruction to perform logic operations OR, AND, XOR, or NOT.

The encoder transforms the binary numbers into doubled form 0−>00=O, 1−>11=I (pulse), for example, 1010−>(11)(00)(11)(00)=IOIO=A and 1001−>(11)(00)(00)(11)=IOOI=B.

The recording system includes a recording head(s), a magnetic medium and a reading sensor(s). Modulation creates the currents corresponding to A, and then B, for the writing head and corresponding sequence of magnetic fields $H_1$ and $H_2$ for the recording medium. The reading sensor detects the magnetization transitions (associated with pulses). We can consider two regimes for the sensor: 1) it detects all transitions, the transitions between −M/2 and M/2, −M and 0, or 0 and M states, and large transitions between −M and M states; 2) it detects the only large transitions between −M and M. In a simple case the sensor detects just the fact of magnetization transition and therefore its sign (up or down) does not matter.

A decoder transforms I=11 to 1 and O=00 to 0 and sends it to the output.

Figure 3:
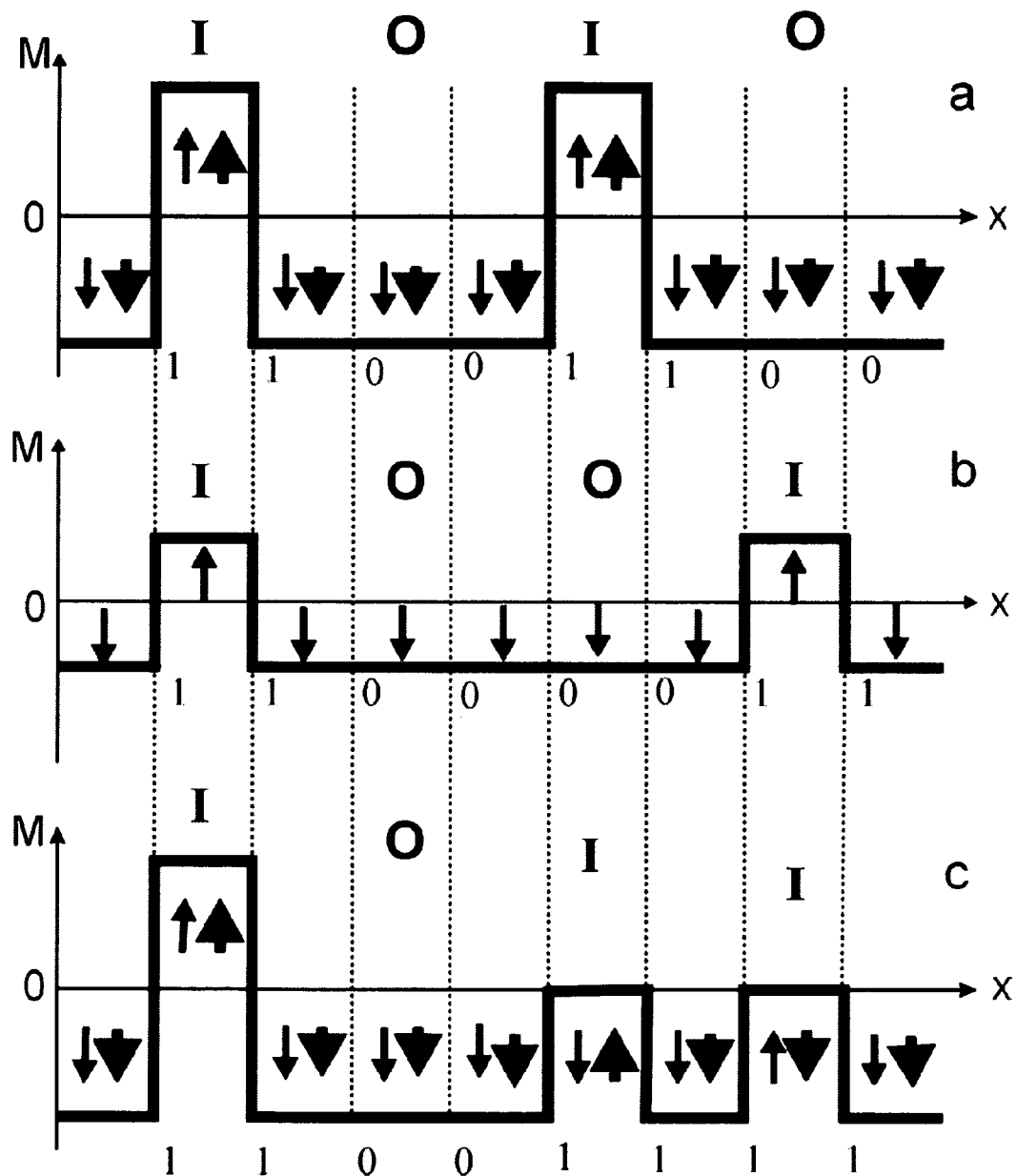
FIG. 3. a) Magnetization profile along the track (x) written by a strong magnetic field $H_1$. The number A=IOIO contains two big pulses. The height of pulses is equal to 2M. b) Magnetization profile for the type 2 particles written by a moderate magnetic field $H_2$. The number B=IOOI contains two small pulses. The height of these pulses is equal to M. c) The resulting magnetization profile consists of one big and two small pulses. The height of the first pulse is equal to 2M, and the height of the two last pulses is M. The vertical dotted lines separate different bits. The ones below each profile denote magnetization transitions, and the zeros indicate the absence of transitions. The bold arrows denote the magnetization corresponding to type 1 particles, and the thin arrows denote the magnetization of the type 2 particles. A magnetic sensor that detects any magnetization transition gives the OR logic operation: IOII=(IOIO)OR(IOOI)=(A)OR(B). A sensor that detects the only largest transitions (between −M and M) gives the AND logic operation IOOO=(IOIO)AND(IOOI)=(A) AND(B).

FIG. 3 illustrates the OR operation with a sensor that does not distinguish the height of peaks: (IOIO)OR(IOOI)=IOII. For a sensor that detects only large magnetization transitions between −M and M we have AND logical operation: (IOIO)AND(IOOI)=IOOO.

We can consider a "negative" (−I) pulse, which is oriented down relative to M or M/2 states. This means that −B has a reversed magnetization profile of B relative to the horizontal axis M=0. It is easy to check that B−B=OOOO.

Figure 4:
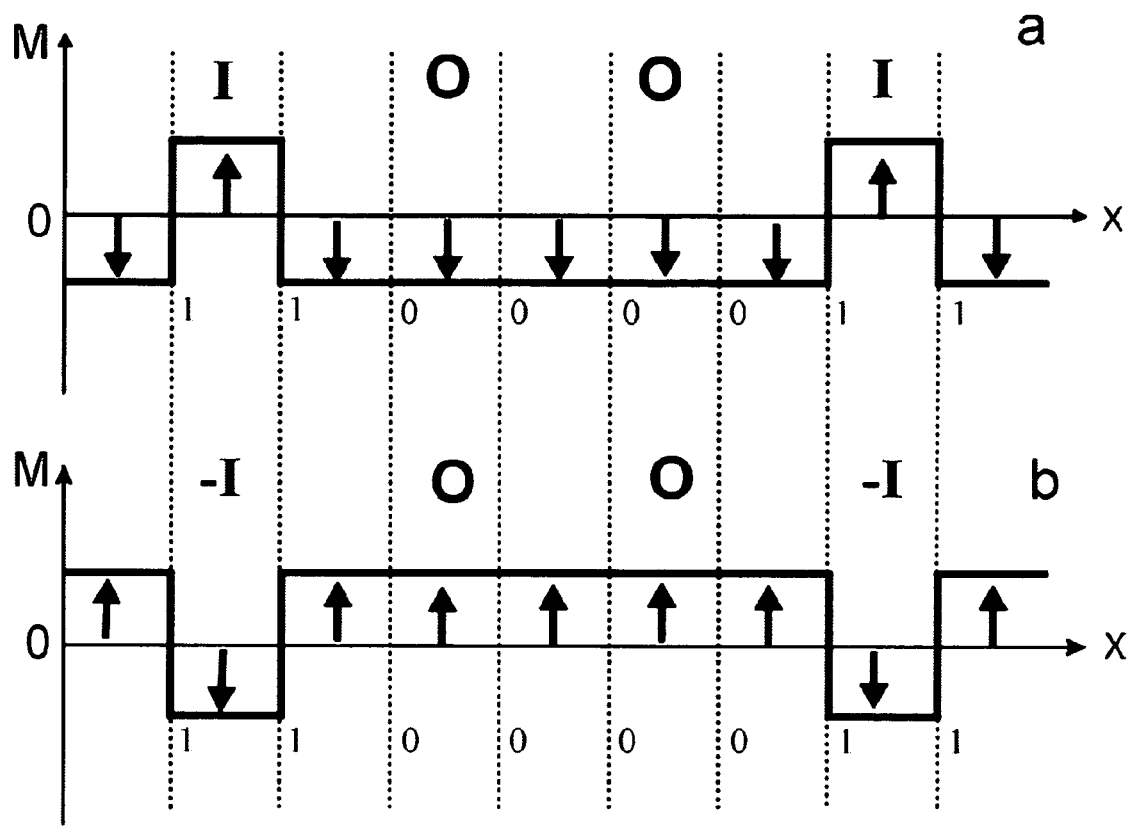
FIG. 4 is an example of the magnetization profile for numbers with a) positive pulses (B=IOOI) and b) negative pulses (−B=−IOO−I).

FIG. 4 illustrates the number with positive pulses IOOI and the number with negative pulses −IOO−I. The latter is the result of inversion of the first number relative to the horizontal axis M=0.

Figure 5:
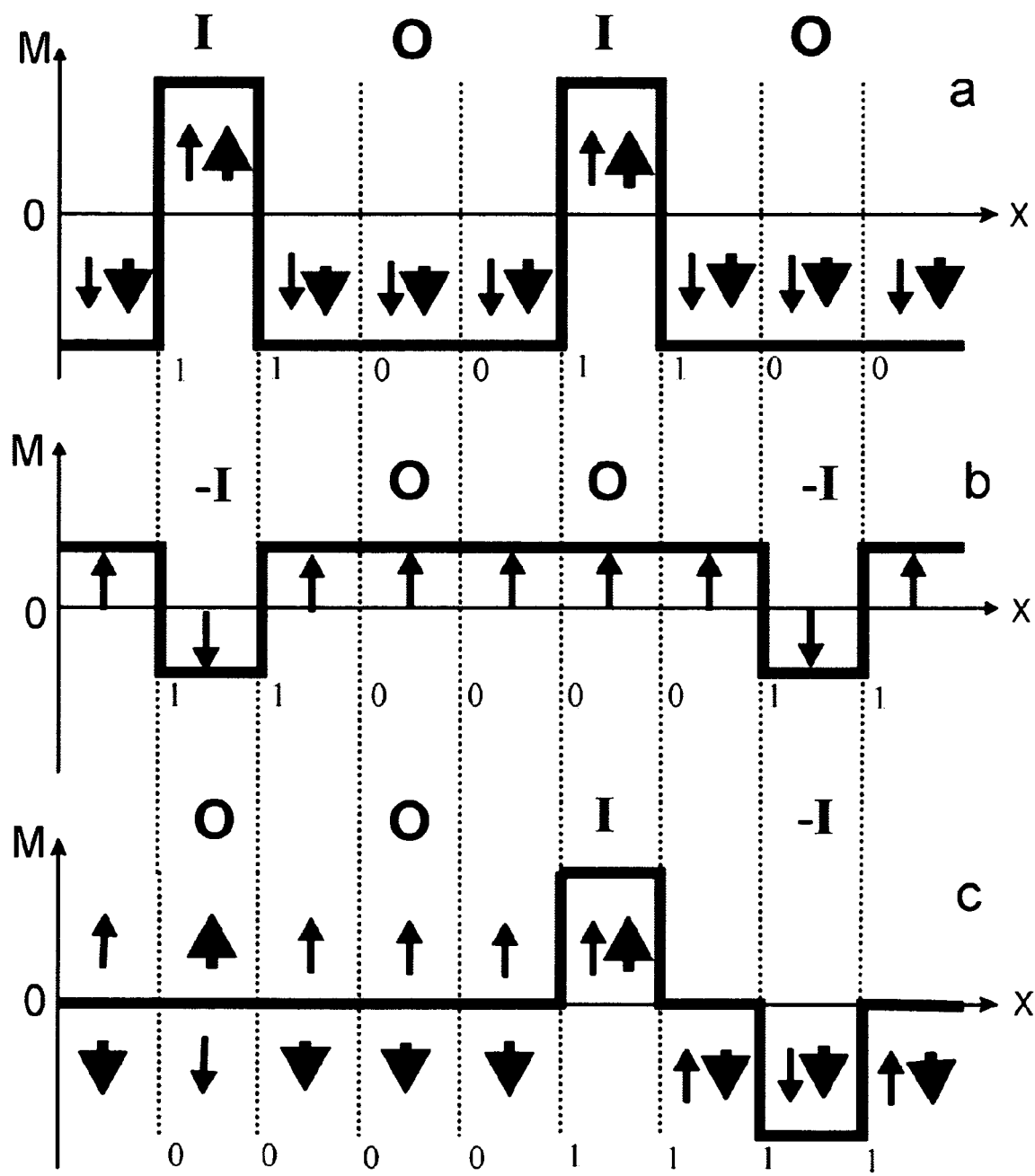
FIG. 5. a) Magnetization profile along the track (x) written by a strong magnetic field, A=IOIO. b) Magnetization profile for the type 2 particles written by a moderate magnetic field, −B=−IOO−I. c) The resulting magnetization profile is C=OOI−I. So far as the sign of the pulse in C does not matter for a magnetic sensor, C=OOII=(IOIO)XOR(IOOI)=(A) XOR(B).

FIG. 5 illustrates the XOR operation. Superimposing the first number A=IOIO and the second number B (in the form of −B=−IOO−I), we obtain C=OOI−I. Neglecting the pulse sign (in a simplest case the sensor does not detect this sign), one has C=OOII and C=(A)XOR(B)=(IOIO)XOR(IOOI). Thus, the superimposition of A and −B gives C=(A)XOR(B) for any numbers A and B.

Figure 6:
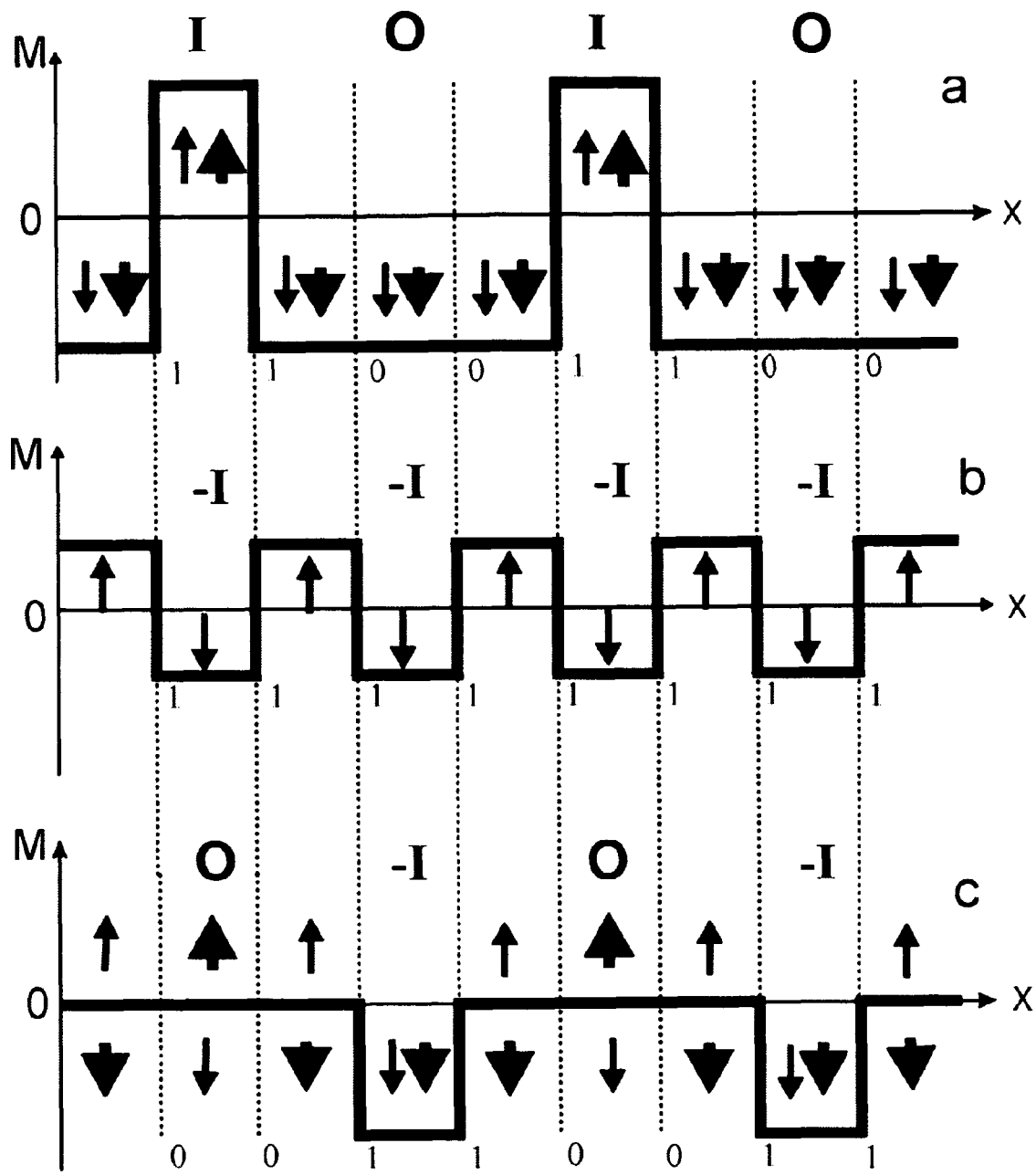
FIG. 6. a) Magnetization profile along the track written by a strong magnetic field, A=IOIO. b) Magnetization profile for the type 2 particles written by a moderate magnetic field, B=−I−I−I−I. c) The resulting magnetization profile is C=O−IO−I. So far as the sign of the pulse in C does not matter for a magnetic sensor, we have C=NOT(A)=OIOI.

The superimposition of any number A with the sequence of negative pulses gives the NOT operation. FIG. 6 illustrates this NOT operation. The number IOIO is superimposed with the sequence of negative pulses −I−I−I−I. The result is O−IO−I. Neglecting the sign of the resulting pulses, we have: NOT (IOIO)=OIOI.

For search purposes we can write the first number A once and then compare this number with a set of numbers $B_1$, $B_2$, ..., rewriting these numbers with moderate fields.

The recording time necessary for logic operations is very small and therefore the magnetic medium can consist of particles with small anisotropy fields. This will reduce energy and heat loss. The particles can also be smaller in size than the standard recording particles, which is important to reduce noise. In order to solve the problem of bit synchronization at superimposition one can increase the linear size of the pulse for example, by introducing extra zeros for coding (11 become 101, and so on). All (or a part of) logic instructions can be written on the same hard drive. In addition, logic operations can also be performed on a magnetic tape and any other recording media with superimposing. The results of XOR and AND logic operations can be used to construct an adder in a conventional way.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of performing a logic operation between two binary numbers A and B on a hard disk drive, said hard drive comprising a recording medium and a read/write head configured in its writing mode to apply a high level magnetic field or a low level magnetic field to said recording medium and also being configured in its reading mode to read a magnetic field from said recording medium, and furthermore, said recording medium configured to respond differently to said high level magnetic field applied by said read/write head, and to said low level magnetic field applied by said read/write head, said method comprising:

a, encoding said binary numbers A and B into a n-bit binary code where n is equal or greater than 2;

b. recording each bit of the n-bit code of said first binary number A on distinct locations on said recording medium by means of said read/write head in its said writing mode operating with said high level magnetic field;

c. recording each bit of the n-bit code of said second number B on corresponding said distinct locations on said recording medium by means of said read/write head in its said writing mode operating with said low level magnetic field;

d. reading result of said logic operation from said distinct locations on said recording medium by means of said read/write head operating in its said reading mode;

e. decoding said result from said n-bit binary code into a binary number.

2. The method of performing a logic operation of claim 1 wherein n is equal to two and also wherein said encoding of said binary number is such that if one of said binary numbers is "0" then it is converted to "00" and if one of said binary numbers is "1" then it is converted to "11" and furthermore wherein said decoding of said binary number is such that if said result is "00" then it is converted to "0" and if said result is "11" then it is converted to "1".

3. The method of performing a logic operation of claim 1 wherein said recording medium is comprised of two kinds of magnetic particles, both kinds of said magnetic particles responding to said high level magnetic field applied by said read/write head, and second kind of said particles responding to said low level magnetic field applied by said read/write head.

4. The method of performing a logic operation of claim 1 wherein said operation is an AND function.

5. The method of performing a logic operation of claim 1 wherein said operation is an OR function.

6. The method of performing a logic operation of claim 1 wherein said operation is an XOR function.

7. The method of performing a logic operation of claim 1 wherein said operation is a NOT function.

\* \* \* \* \*